July 3, 1962   J. H. ANDERSON ETAL   3,041,857
FLEXIBLE COUPLINGS
Filed March 25, 1960   2 Sheets-Sheet 1
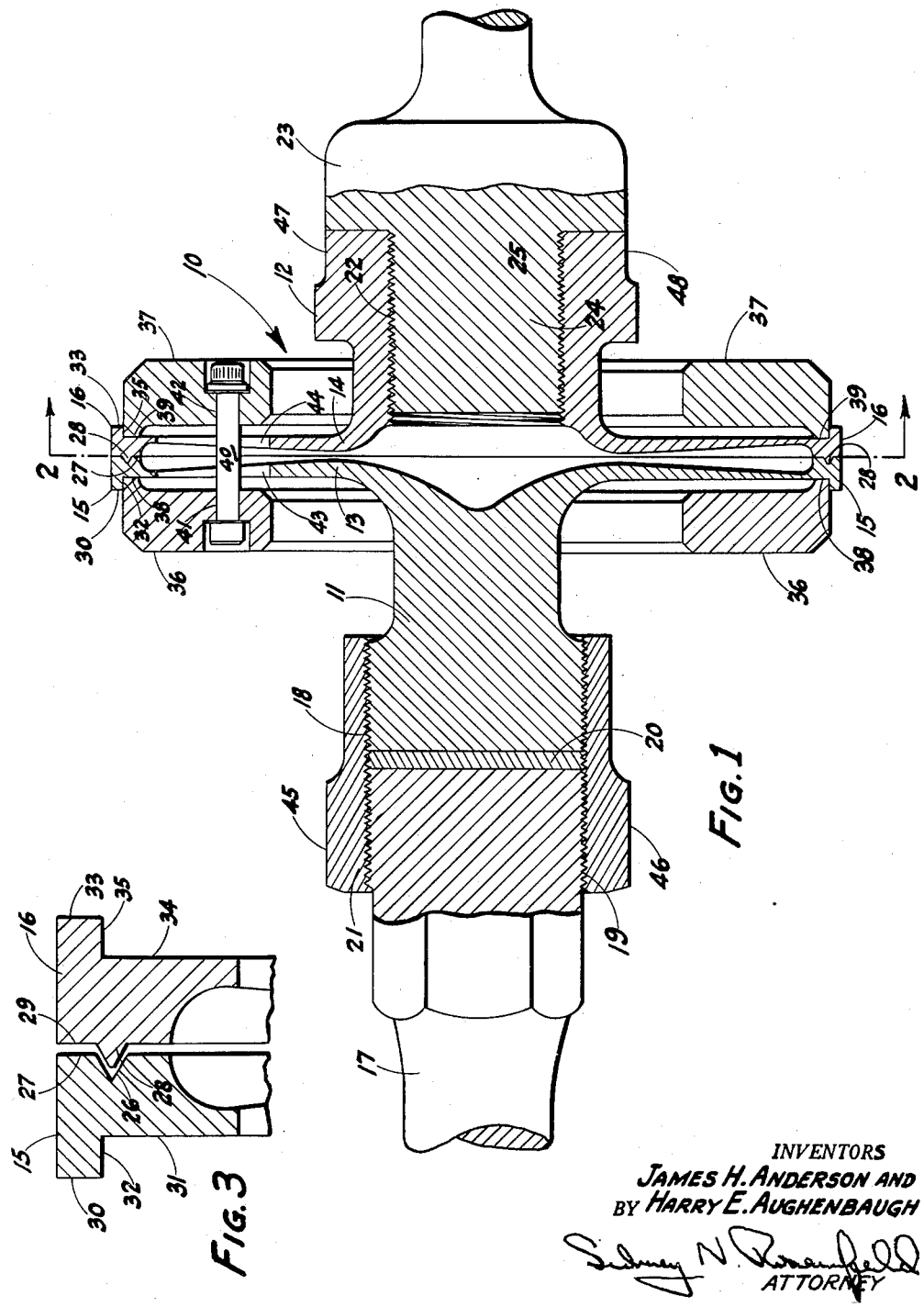
INVENTORS
JAMES H. ANDERSON AND
BY HARRY E. AUGHENBAUGH
Sidney N. Rosenfeld
ATTORNEY July 3, 1962 J. H. ANDERSON ETAL 3,041,857
FLEXIBLE COUPLINGS
Filed March 25, 1960 2 Sheets-Sheet 2

INVENTORS
JAMES H. ANDERSON AND
BY HARRY E. AUGHENBAUGH
ATTORNEY

United States Patent Office 3,041,857
Patented July 3, 1962

3,041,857
FLEXIBLE COUPLINGS
James H. Anderson and Harry E. Aughenbaugh, Spring Garden Township, York County, Pa., assignors to Borg-Warner Corporation, Chicago, Ill., a corporation of Illinois
Filed Mar. 25, 1960, Ser. No. 17,646
11 Claims. (Cl. 64—15)

This invention relates to flexible couplings of the flexible disc type.

The invention relates to a flexible disc coupling of the type shown in the patent to J. H. Anderson, No. 2,793,513, and owned by the assignee of this invention, and is an improvement thereon.

It is an object of the invention to provide a flexible coupling so constructed that the coupling may be simply dismounted without discounting either of the shafts which it connects. Another object of the invention is to provide a flexible coupling of the flexible disc type wherein the entire torque transmitted by the coupling is absorbed by continuous frictional clamping between peripheral edges of the flexible discs.

Yet another object of the invention is to provide a flexible coupling of the flexible disc type of simplified construction, improved axial flexibility, self-aligning, suitable to high rotary speeds, and which may be easily disassembled without dismounting either of the shafts which it connects.

The invention consists of the novel constructions, arrangements and devices to be hereinafter described and claimed for carrying out the above-stated objects and such other objects as will appear from the following description of a preferred embodiment of the invention described with reference to the accompanying drawings, in which:

FIG. 1 is an axial section through the complete coupling;

FIG. 3 is a fragmentary view similar to a portion of FIG. 1, but to a larger scale.

Like numerals refer to like parts throughout the several views.

Figure 4:
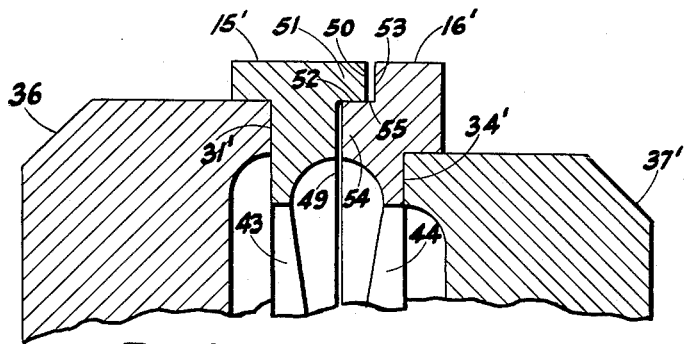
FIG. 4 is a fragmentary view similar to a portion of FIG. 1, showing a modification.

Referring now to the drawings, a flexible coupling 10 is shown. Flexible coupling 10 comprises a pair of hubs 11 and 12. Hub 11 has a flexible disc 13 integrally attached thereto, while hub 12 has a flexible disc 14 integrally attached thereto. These discs 13 and 14 are substantially flat but, however, do taper somewhat in an outwardly radial direction. Disc 13 terminates in a thickened marginal rim 15. Similarly, disc 14 terminates in a thickened marginal rim 16.

Hub 11 is adapted for connection to a driven shaft 17 and has threads 18 thereon, similar to matching threads 19 found on the driven shaft 17. A spacer member 20 is provided and an internally threaded sleeve 21 serves to maintain hub 11 and shaft 17 in assembled relation with the spacer member 20 therebetween. Hub 12 is bored and internally threaded, as indicated at 22, to receive a connecting drive shaft 23. Drive shaft 23 is provided with a reduced end portion 24, having external threads 25 thereon, mating with internal threads 22 for maintaining hub 12 and shaft 23 in assembled relation.

Rim 15 has an annular V-shaped groove 26 on an inwardly directed face 27 thereof. Rim 16 has a somewhat similarly shaped peripheral protuberance 28 formed on an inwardly directed face 29 thereof. Protuberance 28 is adapted to seat in groove 26. It will be appreciated that the entire torque transmitted by the coupling is transmitted via the frictional engagement of rims 15 and 16. The purpose of protuberance 28 and groove 26 is to first increase the frictional contact area between the two rims 15 and 16 (faces 27 and 29), and secondly to act as a self-aligning means to automatically center the two rims with respect to one another, even though the two shafts which they connect may be somewhat misaligned.

A reverse face 30 of rim 15 is counterbored as at 31, forming an annular flange 32 therearound. Similarly, opposed face 33 of rim 16 is counterbored as at 34 to form an annular flange 35 therearound. Flanges 32 and 35 serve to define clamping ring seats. A pair of identical clamping rings 36 and 37 are received within flanges 32 and 35 respectively. Clamping rings 36 and 37 are formed with marginal, annular, inwardly directed clamping edges 38 and 39 respectively seated within counterbores 31 and 34, and against rims 15 and 16.

Figure 2:
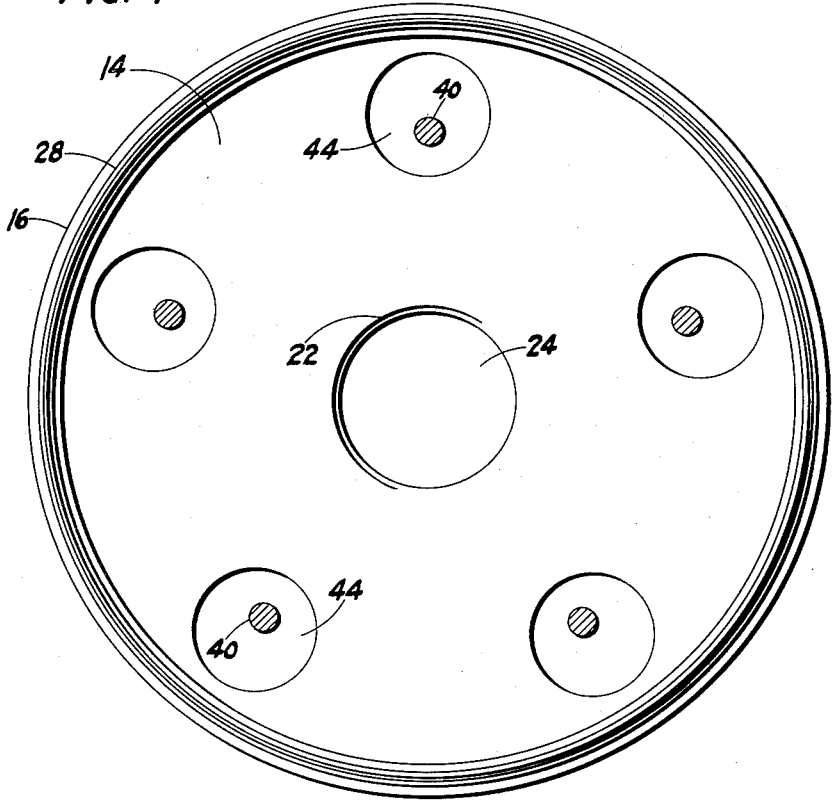
FIG. 2 is a sectional view taken along the line 2—2 of FIG. 1.

The rings 36 and 37 are drawn together to clamp the rims 15 and 16 together. Clamping pressure can be applied in several ways, but we prefer and show five bolts 40, which pass through aligned holes 41 and 42 in rings 36 and 37, and aligned holes 43 and 44 in discs 13 and 14. Bolts 40 closely fit the holes 41 and 42, as best may be seen from an inspection of FIG. 1. FIG. 2 reveals that holes 43 and 44 in the discs 13 and 14 are much larger than the shanks of the bolts 40. As a consequence, free flexure of discs 13 and 14 within the confines of clamping rings 36 and 37 is assured. Further, bolts 40 are loaded only in tension and never in shear, since they take no part of the torque transmitted via discs 13 and 14.

Some means is desirably provided for affording a wrench grip on sleeve 21, and takes the form of two opposed flats 45 and 46. Hub 12 is similarly provided with a pair of flats 47 and 48 for the same purpose.

In disassembling the coupling, bolts 40 are first removed. Thereafter it is only necessary that sleeve 21 be removed from around hub 11 and driven shaft 17 by unthreading it to the left, as seen in FIG. 1. This will permit spacer 20 to drop out, allowing hub 11 to be moved to the left against driven shaft 17 a sufficient distance for inner face 27 of rim 15 to clear the protuberance 28. This permits the hub 11 to be laterally moved with respect to hub 12, along with clamping ring 36. It will be appreciated that for this to occur, spacer 20 must be of a thickness somewhat greater than the thickness of the protuberance 28. With hub 11 removed, sufficient space is afforded for hub 12 to be unthreaded from end portion 24 and removed therefrom along with its clamping ring 37, thereby completing the disassembly.

In assembling the coupling, it will be apparent that the reverse procedure will be followed with protuberance 28 and groove 26 serving to center the two rims and consequently hubs 11 and 12 with respect to one another. Groove 26 and protuberance 28 also serve to align the two hubs 11 and 12 should shafts 17 and 23 be somewhat misaligned, as was pointed out above.

FIG. 4 shows a modified construction, in which a pair of rims 15' and 16' afford a different self-centering and aligning method from that shown in FIG. 1. Rim 15' has a counterbore 49 formed in an inner face 50 thereof, which counterbore defines a peripheral edge portion 51 having an inwardly directed seating face 52. Rim 16' is step contoured on an inner face 53 thereof, as shown, to form an intermediate protuberance 54 having an outwardly directed face 55. Protuberance 54 seats within counterbore 49 with face 55 bearing against seating face 52. Rim 16' is provided with a counterbore 34' of lesser diameter than the corresponding counterbore 31' provided in rim 15'. Clamping ring 37' must therefore of necessity be of lesser diameter than clamping ring 36, but otherwise is identical in shape and form.

In this embodiment, pressure of clamping ring 37' against rim 16', as shown in FIG. 4, rotates the outer section of rim 16' slightly and produces a tightening and centering fit between the outwardly directed face 55 of protuberance 54 and the inwardly directed seating face 52 of edge portion 51. The net effect is that the two rims are self-aligning with each being automatically centered with respect to the other, even though the two shafts which they connect may be somewhat misaligned. This is an effect similar to that had with rims 15 and 16 and their respective groove 26 and mating protuberance 28.

We wish it to be understood that our invention is not to be limited to the specific constructions and arrangements shown and described, except only insofar as the claims may be so limited, as it will be apparent to those skilled in the art that changes may be made without departing from the principles of the invention.

We claim:

1. A flexible coupling for connecting two shafts which are approximately axially aligned comprising two hubs, each hub having means to fix it to the end of a corresponding shaft and each having an integral flexible disc, said discs each terminating in a marginal rim, said rims being in opposed face relation, a spacer member between one of said hubs and the corresponding shaft, a pair of annular clamping rings one each seated against the reverse faces of said rims, means serving to draw said clamping means together to maintain said rims in frictional engagement, and means for aligning said rims when said clamping means are drawn together comprising a counterbore defining a peripheral edge portion on the opposed face of one of said rims and an intermediate protuberance on the opposed face of the other of said rims, said protuberance being seated in said counterbore and wherein said clamping ring is seated against said last mentioned rim such that the outer section thereof is rotated to force said protuberance against said edge portion.

2. A flexible coupling for connecting two shafts which are approximately axially aligned comprising two hubs, each hub having means to fix it to the end of a corresponding shaft and each having an integral flexible disc substantially normal to the axis of the hub, said discs each having a marginal rim with a face of one rim being opposed by a face of the other, means for maintaining said opposed faces centered with respect to each other, a pair of annular clamping rings one each seated against the reverse face of said rims, means serving to draw said clamping rings together to maintain said rims in frictional engagement, and a spacer member between one of said hubs and the corresponding shaft.

3. The flexible coupling of claim 2 wherein said means for maintaining said opposed faces centered comprises a counterbore defining a peripheral edge portion on the opposed face of one of said rims and an intermediate protuberance on the opposed face of the other of said rims, said protuberance seating in said counterbore and wherein said clamping ring is seated against said last mentioned rim such that the outer section thereof is rotated to force said protuberance against said edge portion.

4. The flexible coupling of claim 2 wherein said means for fixing said hubs to the end of a corresponding shaft comprises an internally threaded bore in one of said hubs for receiving therein one of said shafts, said other hub being externally threaded, and a sleeve member for confining said externally threaded hub and the other shaft, said spacer member being mounted between said externally threaded hub and the corresponding shaft.

5. The flexible coupling of claim 2 wherein said means serving to draw said clamping means together comprise a plurality of bolts passing through said clamping rings and said discs, and said discs having apertures therein of greater diameter than said bolts for receiving said bolts therethrough.

6. A flexible coupling for connecting two shafts which are approximately axially aligned comprising two hubs, each hub having means to fix it to the end of a corresponding shaft and each having an integral flexible disc substantially normal to the axis of the hub, said discs having a marginal rim with a face of one rim being opposed by a face of the other, means for maintaining said opposed faces in alignment, the reverse face of each of said rims having a peripheral flange therearound defining a clamping ring seat, annular clamping rings having marginal annular clamping edges confined by said seats and bearing on said rims, means serving to draw said clamping means together to maintain said rims in frictional engagement, and a spacer member between one of said hubs and the corresponding shaft.

7. A flexible coupling for connecting two shafts which are approximately axially aligned comprising two hubs each hub having means to fix it to the end of a corresponding shaft and each having an integral flexible disc substantially normal to the axis of the hub, said discs having a marginal rim with a face of one rim being opposed by a face of the other, one of said opposed faces having a V-shaped protuberance thereon and the other of said opposed faces having a similarly shaped groove therein for receiving said protuberance, a pair of annular clamping rings one each seated against the reverse face of said rims, means serving to draw said clamping rings together to maintain said rims in frictional engagement, and a spacer member between one of said hubs and the corresponding shaft, said spacer member being of a thickness somewhat greater than the thickness of said V-shaped protuberance.

8. The flexible coupling of claim 7 wherein said means for fixing said hubs to the end of a corresponding shaft comprises an internally threaded bore in one of said hubs for receiving therein one of said shafts, said other hub being externally threaded, and a sleeve member for confining said externally threaded hub and the other shaft, said spacer member being mounted between said externally threaded hub and the corresponding shaft.

9. The flexible coupling of claim 7 wherein said means serving to draw said clamping means together comprise a plurality of bolts passing through said clamping rings and said discs, and said discs having apertures therein of greater diameter than said bolts for receiving said bolts therethrough.

10. A flexible coupling for connecting two shafts which are approximately axially aligned comprising two hubs, each hub having means to fix it to the end of a corresponding shaft and each having an integral flexible disc substantially normal to the axis of the hub, said discs having a marginal rim with a face of one rim being opposed by a face of the other, one of said opposed faces having a V-shaped protuberance thereon and the other of said opposed faces having a similarly shaped groove therein for receiving said protuberance, the reverse face of each of said rims having a peripheral flange therearound defining a clamping ring seat, annular clamping rings having marginal annular clamping edges confined by said seats and bearing on said rims, means serving to draw said clamping rings together to maintain said rims in frictional engagement, and a spacer member between one of said hubs and the corresponding shaft, said spacer member being of a thickness somewhat greater than the thickness of said V-shaped protuberance.

11. A flexible coupling for connecting two shafts which are approximately axially aligned comprising two hubs, each hub having means to fix it to the end of a corresponding shaft and each having an integral flexible disc substantially normal to the axis of the hub, said discs having a marginal rim with a face of one rim being opposed by a face of the other, one of said opposed faces having a V-shaped protuberance thereon and the other of said opposed faces having a similarly shaped groove therein for receiving said protuberance, the reverse face of each of said rims having a peripheral flange therearound defining a clamping ring seat, annular clamping rings having marginal annular clamping edges confined by said seats and bearing on said rims, a plurality of bolts passing through said clamping rings and discs to draw said clamping rings together to maintain said rims in frictional engagement, said discs having apertures therein of greater diameter than said bolts for the reception thereof, and a filler piece between one of said hubs and the corresponding shaft, said filler piece being of a thickness somewhat greater than the thickness of said V-shaped protuberance.

References Cited in the file of this patent

UNITED STATES PATENTS

| | | |
|---|---|---|
| 349,365 | Roots | Sept. 21, 1886 |
| 1,664,052 | Ungar | Mar. 27, 1928 |
| 1,978,814 | Myers | Oct. 30, 1934 |
| 2,550,580 | McLeod et al. | Apr. 24, 1951 |
| 2,679,414 | Hornschuch | May 25, 1954 |
| 2,679,734 | Morey | June 1, 1954 |
| 2,793,513 | Anderson | May 28, 1957 |
| 2,862,372 | Weidner | Dec. 2, 1958 |